(12) United States Patent
Mordau et al.

(10) Patent No.: US 8,763,970 B2
(45) Date of Patent: Jul. 1, 2014

(54) HOLDING CLIP FOR A RAIN SENSOR

(75) Inventors: Ulf Mordau, Deisslingen (DE); Andreas Neumann, Gaienhofen-Horn (DE)

(73) Assignee: TRW Automotive Eletronics & Components GmbH & Co. KG, Radolfzell (DE)

( * ) Notice: Subject to any disclaimer, the term of this patent is extended or adjusted under 35 U.S.C. 154(b) by 0 days.

(21) Appl. No.: 11/654,708

(22) Filed: Jan. 18, 2007

(65) Prior Publication Data

US 2007/0164188 A1 Jul. 19, 2007

(30) Foreign Application Priority Data

Jan. 19, 2006 (DE) .................. 20 2006 000 853 U
Aug. 28, 2006 (DE) .................. 10 2006 040 213

(51) Int. Cl.
*A47F 5/00* (2006.01)
*G01D 11/24* (2006.01)
*G01D 11/30* (2006.01)

(52) U.S. Cl.
CPC ............ *B06S 1/0881* (2013.01); *G01D 11/245* (2013.01); *G01D 11/30* (2013.01)
USPC .......................................... 248/300; 340/604

(58) Field of Classification Search
CPC ..... B60S 1/0881; G01D 11/245; G01D 11/30
See application file for complete search history.

(56) References Cited

U.S. PATENT DOCUMENTS

| 5,543,923 | A | * | 8/1996 | Levers et al. .................. 356/445 |
| 5,710,633 | A | | 1/1998 | Klappenbach et al. |
| 5,816,550 | A | * | 10/1998 | Watanabe et al. ......... 248/222.11 |
| 6,299,319 | B1 | * | 10/2001 | Mertens et al. ............... 359/871 |
| 6,367,752 | B1 | * | 4/2002 | Forsythe et al. ......... 248/220.21 |
| 6,581,484 | B1 | | 6/2003 | Schuler |
| 6,698,701 | B1 | * | 3/2004 | Dalton ..................... 248/222.12 |
| 6,894,619 | B1 | * | 5/2005 | Schmitt et al. ................ 340/604 |
| 6,900,733 | B2 | * | 5/2005 | Schneider ..................... 340/602 |
| 7,178,776 | B2 | * | 2/2007 | Buck et al. ..................... 248/300 |
| 2004/0020285 | A1 | | 2/2004 | Schneider |
| 2004/0096040 | A1 | * | 5/2004 | Kilcher et al. ................ 378/189 |
| 2005/0194504 | A1 | * | 9/2005 | Takai ............................. 248/300 |

FOREIGN PATENT DOCUMENTS

| CA | 2572728 | 1/2007 |
| CN | 1361734 | 7/2000 |
| DE | 19804165 | 2/1999 |
| DE | 10156241 | 6/2003 |
| DE | 10309758 | 9/2004 |
| DE | 10326854 | 12/2004 |
| DE | 10326855 | 12/2004 |
| DE | 102004032749 | 1/2006 |
| EP | 1431145 | 6/2004 |
| EP | 1486388 | 12/2004 |
| EP | 1491404 | 12/2004 |

(Continued)

*Primary Examiner* — Korie H Chan
(74) *Attorney, Agent, or Firm* — Tarolli, Sundheim, Covell & Tummino LLP

(57) ABSTRACT

A holding clip (16) for a sensor (10) includes a plate (22), the plate (22) being able to cover the sensor, at least one holding arm (26) and at least one detent arm (28), the holding arm (26) and the detent arm (28) being constructed such that they can engage on a holding frame (12) for the sensor (10), the holding clip (16) being formed integrally.

16 Claims, 15 Drawing Sheets

(56) References Cited

FOREIGN PATENT DOCUMENTS

| | | | |
|---|---|---|---|
| EP | 1202885 | 5/2005 | |
| ES | 2286615 | 11/2005 | |
| FR | 2839016 | 10/2003 | |
| FR | 2839016 A1 * | 10/2003 | .............. B60C 23/04 |
| JP | 09000688 | 1/1997 | |
| JP | 09180566 | 7/1997 | |
| JP | 09510416 | 10/1997 | |
| JP | 10142070 | 5/1998 | |
| JP | 2000028753 | 1/2000 | |
| JP | 2006012644 | 1/2006 | |
| WO | 2004079300 | 9/2004 | |

\* cited by examiner

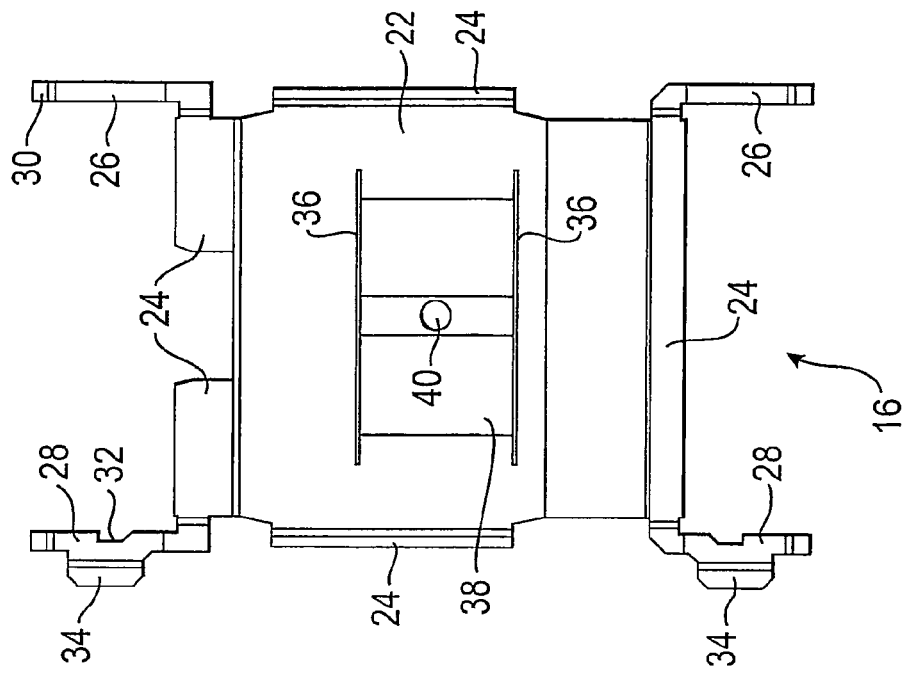
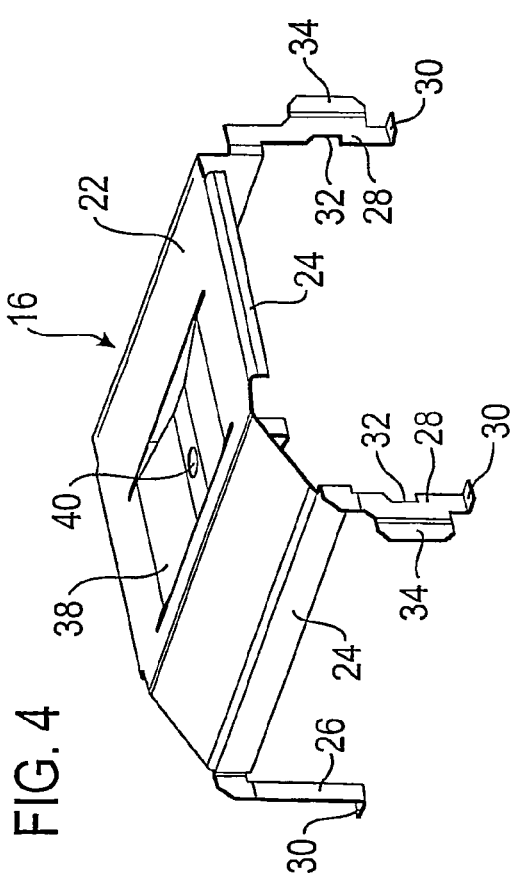

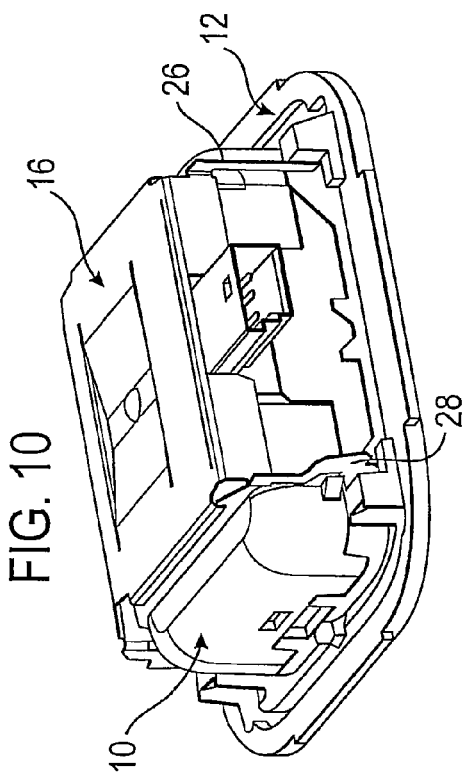
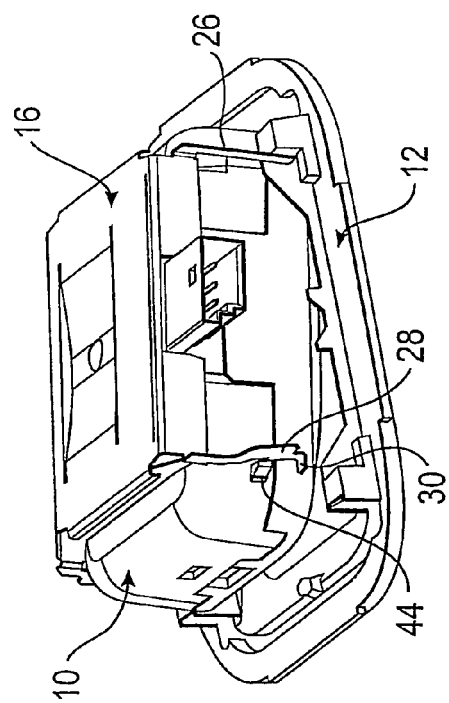
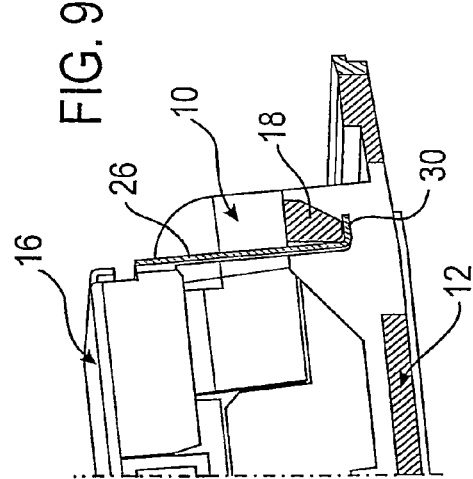

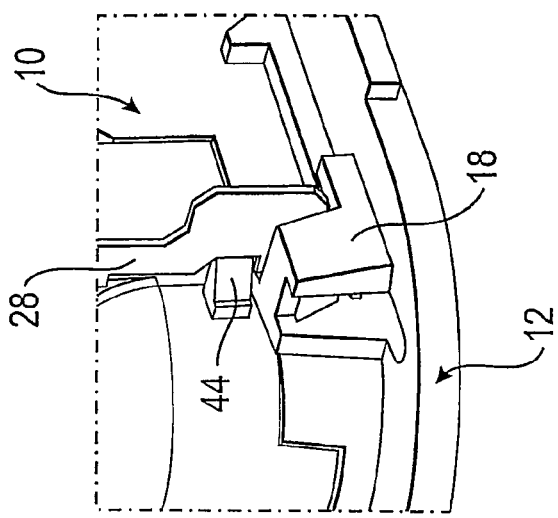
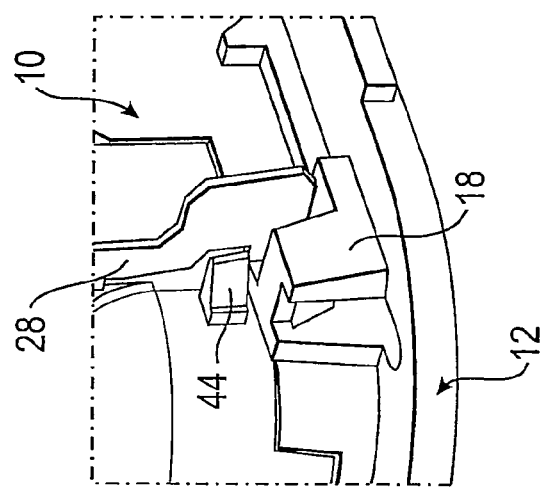
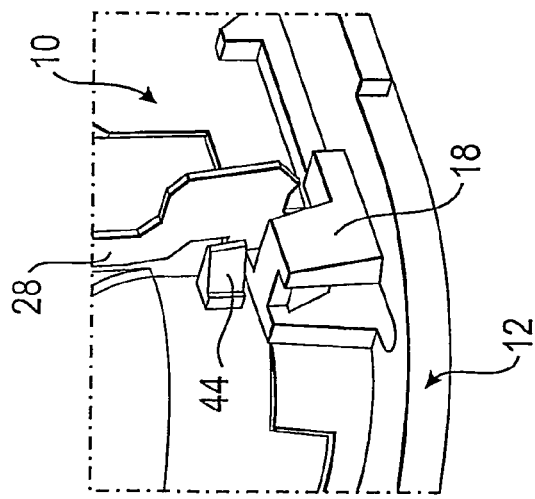

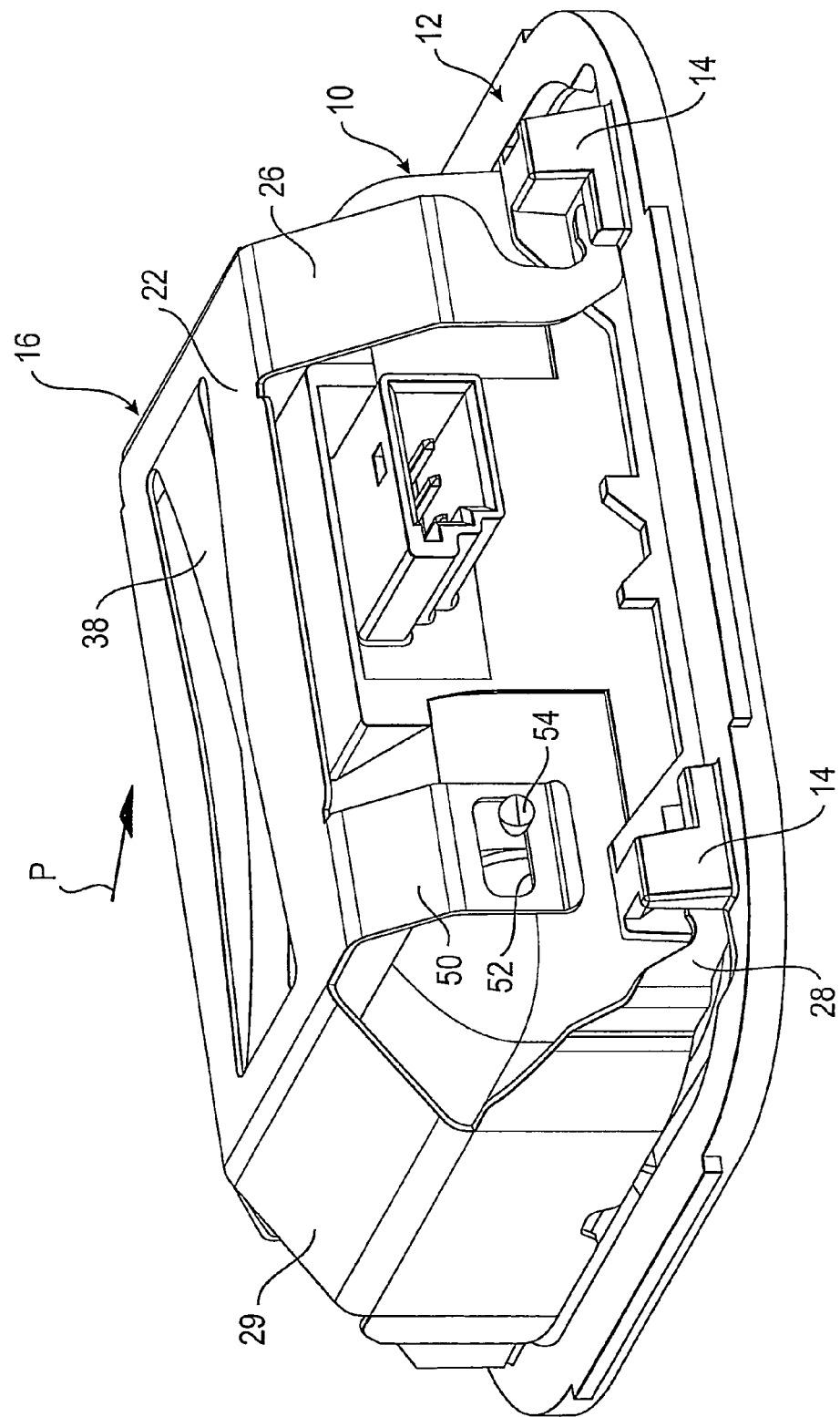

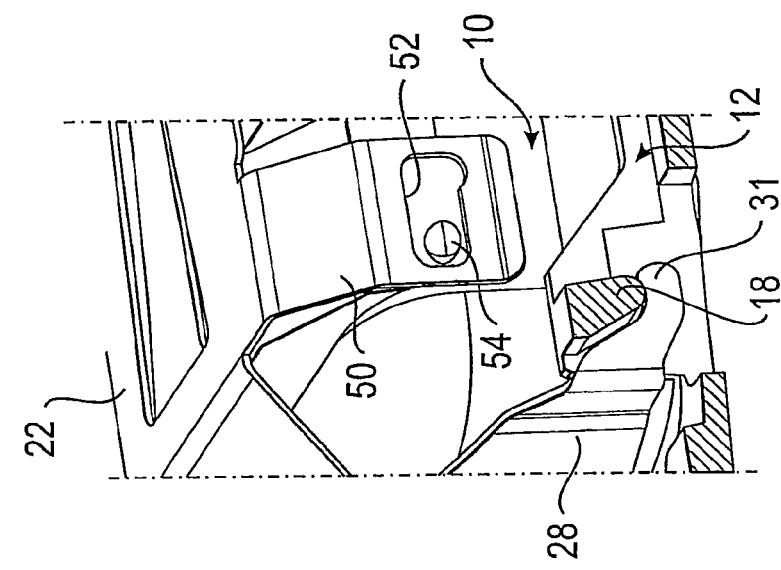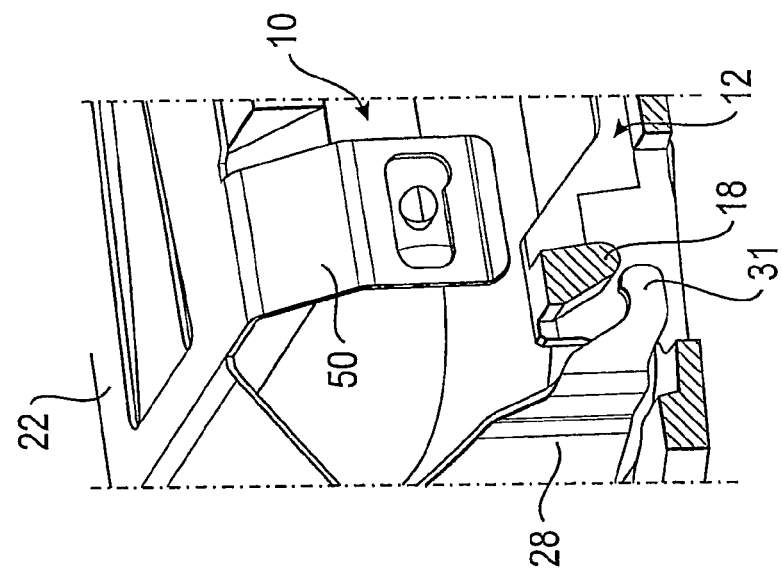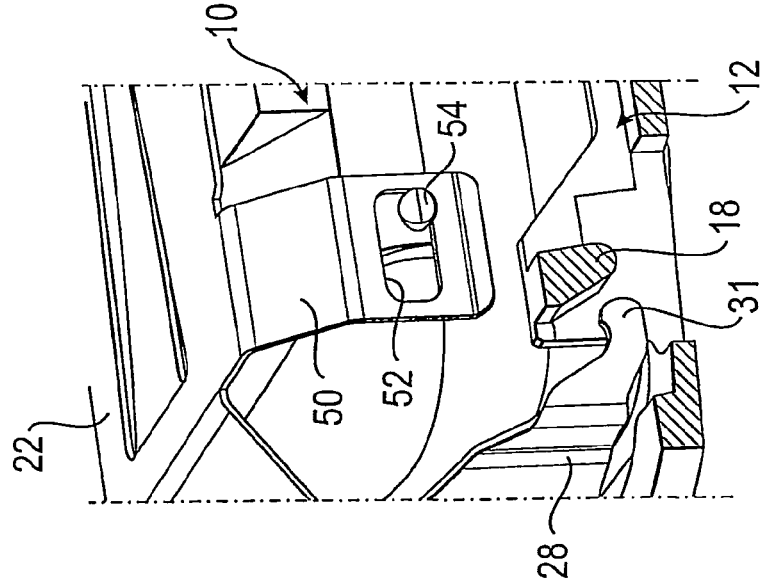

HOLDING CLIP FOR A RAIN SENSOR

TECHNICAL FIELD

The invention relates to a holding clip by which a sensor, particularly a rain sensor, can be mounted on a holding frame. The invention also relates to an assembly consisting of a holding frame which can be mounted on a pane of a motor vehicle, a sensor, particularly a rain sensor, and a holding clip by means of which the sensor can be mounted on the holding frame.

BACKGROUND OF THE INVENTION

A rain sensor is known from EP 1 202 885, which can be mounted on a holding frame by means of two spring clips. This type of mounting of the sensor requires a housing of comparatively complex design for the sensor, so that the spring clips can be applied, and requires spring clips of comparatively complex manufacture which are provided with curved sections which are therefore not easy to produce. In addition, the final installation is comparatively difficult, because the two spring clips must be engaged whilst the sensor has to be held in the holding frame.

The object of the invention consists in providing a holding clip and an assembly with a sensor and a holding clip, which is distinguished by low production costs and a reliable mounting.

BRIEF SUMMARY OF THE INVENTION

This is achieved by a holding clip for a sensor including a plate, the plate being able to cover the sensor, at least one holding arm and at least one detent arm, the holding arm and the detent arm being constructed such that they can engage on a holding frame for the sensor, the holding clip being formed integrally. The invention is based on the fundamental idea of using only a single component for fastening the sensor, namely the holding clip. The latter embraces the sensor over a large surface on the side facing away from the holding frame and may be engaged on the holding frame with a fluid movement, particularly a movement in a single direction.

Advantageous developments of the invention will be apparent from the sub-claims.

BRIEF DESCRIPTION OF THE DRAWINGS

FIG. 3 shows a top view onto a punched piece which can be bent to form the holding clip according to the first embodiment;

FIG. 4 shows a perspective view of the bent holding clip according to the first embodiment;

FIG. 5 shows a further perspective view of the bent holding clip according to the first embodiment;

FIG. 8 shows a first step in the mounting of the sensor on the holding frame by means of a holding clip according to the first embodiment;

FIG. 9 shows on an enlarged scale a detail, partially in section, of FIG. 8;

FIG. 10 shows a second step in the mounting of the sensor by means of the holding clip according to the first embodiment;

FIG. 13 shows on an enlarged scale a detent tongue of the holding clip according to the first embodiment in the state of FIG. 10;

FIG. 14 shows an intermediate state in a view corresponding to that of FIG. 13;

FIG. 15 shows on an enlarged scale the detent arm in the state of FIG. 12;

FIG. 22 shows the assembly of FIG. 20 before a second step in the mounting of the sensor on the holding frame;

FIG. 25 shows in a view partially in section one of the detent arms before the second step in mounting on the holding frame;

FIG. 26 shows the detent arm of FIG. 25 in an intermediate position during the second mounting step;

FIG. 27 shows the detent arm of FIG. 26 after the second mounting step;

DETAILED DESCRIPTION OF THE PREFERRED EMBODIMENTS

Figure 1:
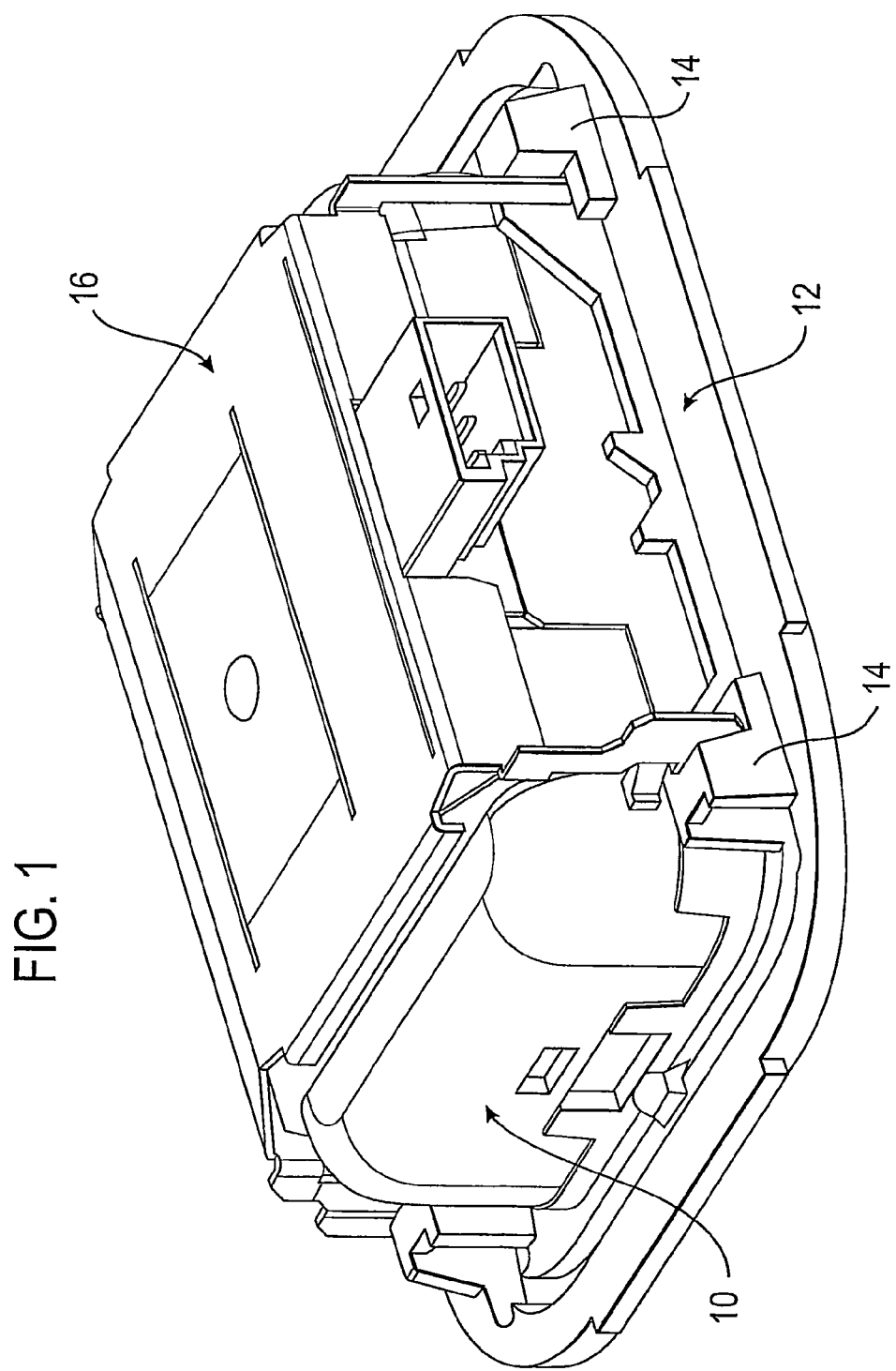
FIG. 1 shows a perspective view of the sensor mounted on the holding frame by means of a holding clip according to a first embodiment.
Figure 2:
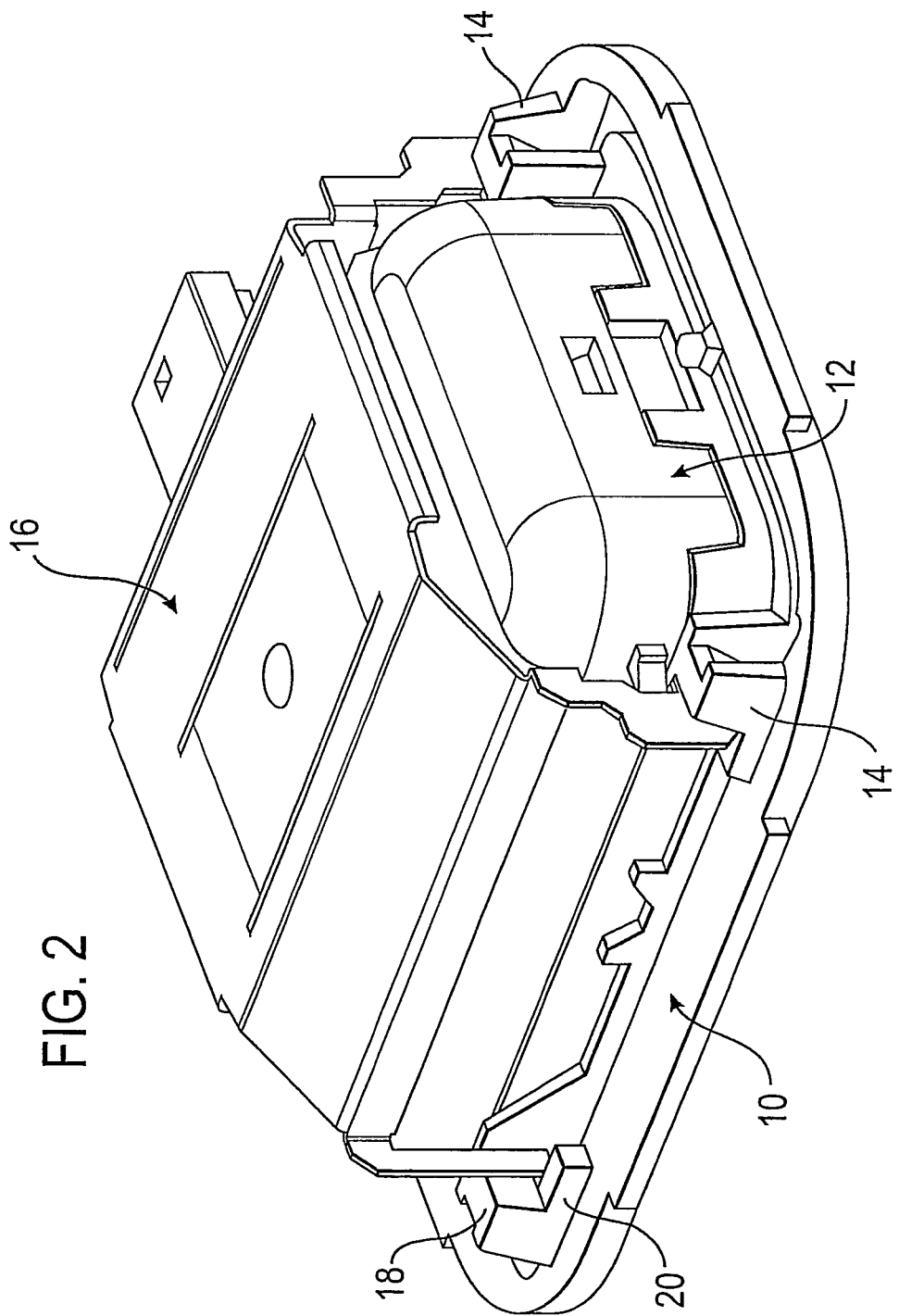
FIG. 2 shows a second perspective view of the sensor mounted by means of the holding clip according to the first embodiment.

In FIGS. 1 and 2 a sensor 10 is shown, which in particular may be a rain sensor which is mounted on a windscreen of a motor vehicle. The sensor 10 is inserted into a holding frame 12 which can be glued to the windscreen. The holding frame 12 has four abutments 14 in total which serve to engage a holding clip 16 according to a first embodiment securely with the holding frame 12. Each abutment 14 consists of a bracket 18 and a fixing cross-piece 20.

The holding clip 16 (see in particular FIGS. 3 to 5) is an integral, punched bent sheet metal part which has a plate 22, a bent edge 24 on each side of the plate, two holding arms 26 and two detent arms 28.

The two holding arms 26, like the two detent arms 28, have a bent foot 30 at their free end facing away from the plate 22. The holding arms 26 are formed with a straight outer contour, whilst the detent arms 28 each have a recess 32 on their inner side. A wing 34 is provided on the outer side in each case. The wing 34 serves firstly to stabilize the detent arm 28 such that the necessary strength is guaranteed in spite of the recess 32. Secondly, during the pre-assembly which is described later, it makes it possible to draw the corresponding detent arm behind a detent nose.

Two parallel, slit-like notches 36 are punched into the plate 22 so that a spring tongue 38 is defined between them. The spring tongue 38 is bent out downwards from the plane of the plate (see in particular FIGS. 4 and 5), i.e. onto the side on which the holding arms 26 and the detent arms 28 are also situated. The spring tongue 38 is provided centrally with an opening 40.

In a first mounting step, the holding clip 16 is pre-mounted on the sensor 10. Here, the plate 22 is placed onto the rear side of the sensor so that the holding arms and the detent arms extend laterally approximately in the vicinity of the corners of the housing of the sensor 10 along the housing. The bent edges 24 serve for fixing here. The positioning is further improved by a recess on an edge 24 into which a plug connector 43 of the sensor 10 is inserted. In addition, the housing of the sensor 10 is provided with a fixing projection 42 which engages into the opening 40 in the spring tongue 38.

Figure 7:
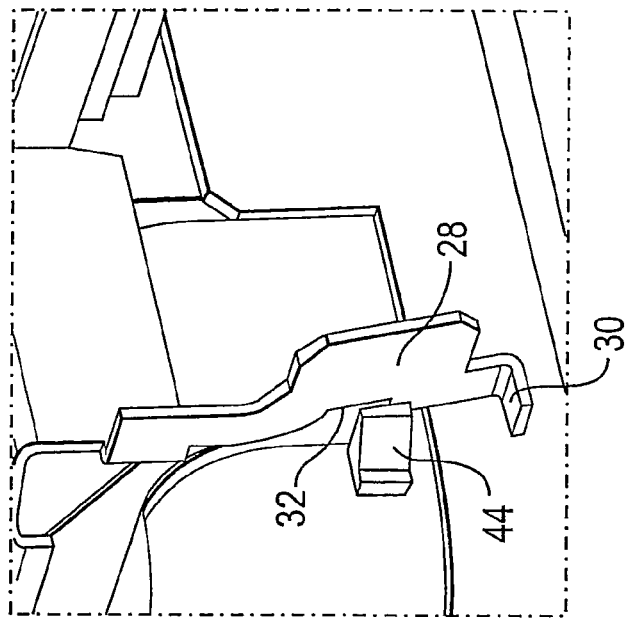
FIG. 7 shows a detail of FIG. 6 on an enlarged scale.
Figure 6:
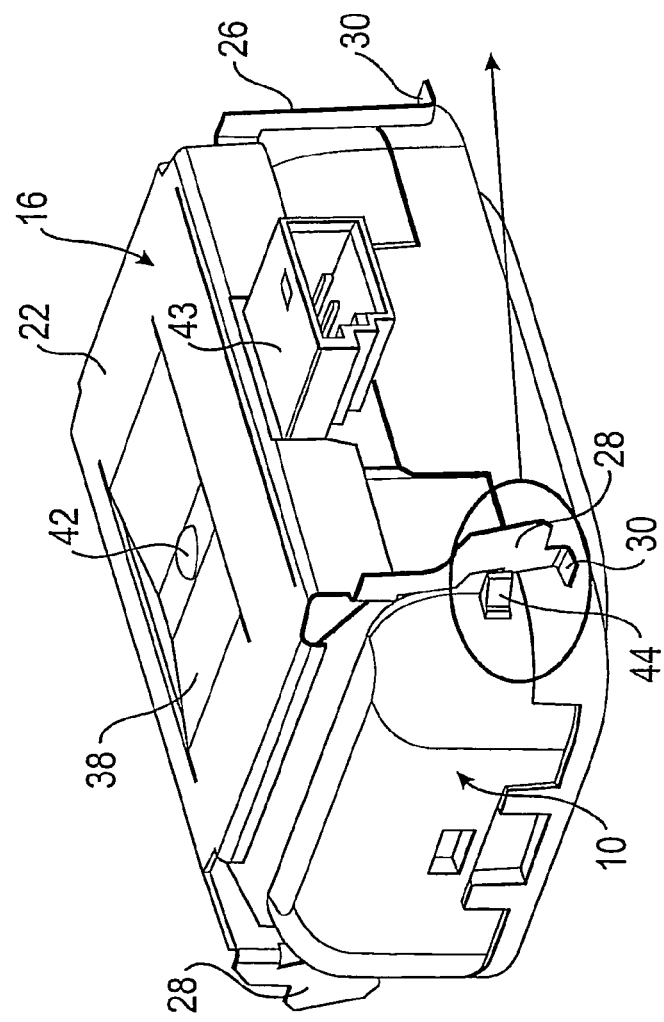
FIG. 6 shows a perspective view of the holding clip, pre-mounted on the sensor, according to the first embodiment.

Two detent noses 44, which can cooperate with the two detent arms 28, are provided on the housing of the sensor 10. In the pre-mounted state shown in FIGS. 6 and 7, the detent noses 44 hold the detent arms 28 in an elastically deflected state. More precisely, the detent arms 28 are held in a state in which their feet 30 are bent towards the holding arms 26, so that the distance between the feet of a detent arm 28 and of a holding arm 26 is reduced on one side of the housing of the sensor. It can be seen in FIG. 7 that the detent nose 44 engages here just below the recess 32 on the detent arm 28.

In this pre-mounted state, the sensor 10 and the holding clip 16 are inserted into the frame 12 such that the feet 30 of the holding arms 26 engage into the brackets 18 on one side of the holding frame 12 (see FIGS. 8 and 9). The fixing cross-pieces 20 serve here for prefixing and prevent the holding arms 26 from slipping laterally. As the detent noses 44 hold the detent arms 28 in an elastically deflected state, the feet 30 of the detent arms 28 can be moved past the bracket which is associated with them, so that the sensor 10 with the holding clip 16 can be swivelled completely downward from the position shown in FIG. 8 into the position shown in FIG. 10.

Figure 11:
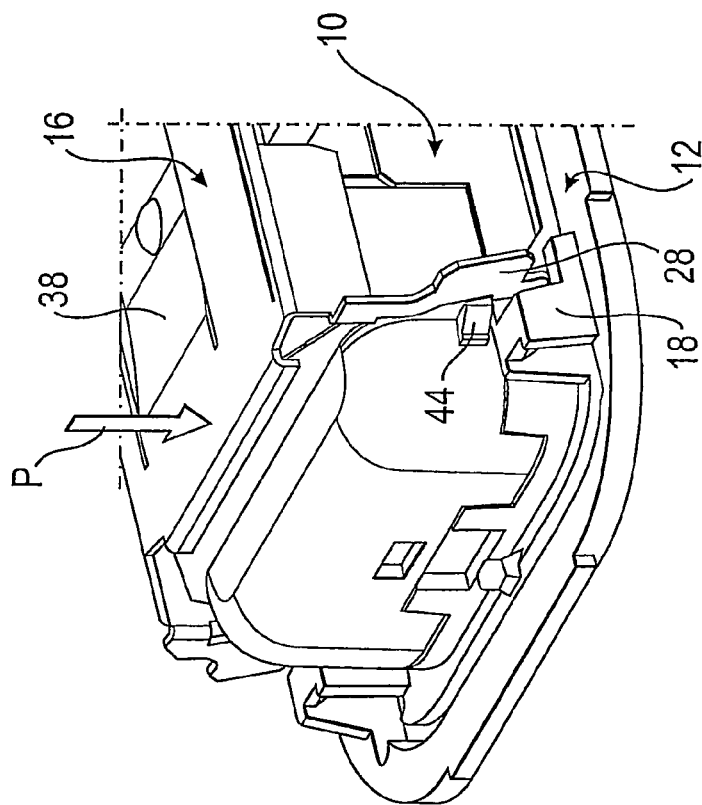
FIG. 11 shows on an enlarged scale a detail of FIG. 10.
Figure 12:
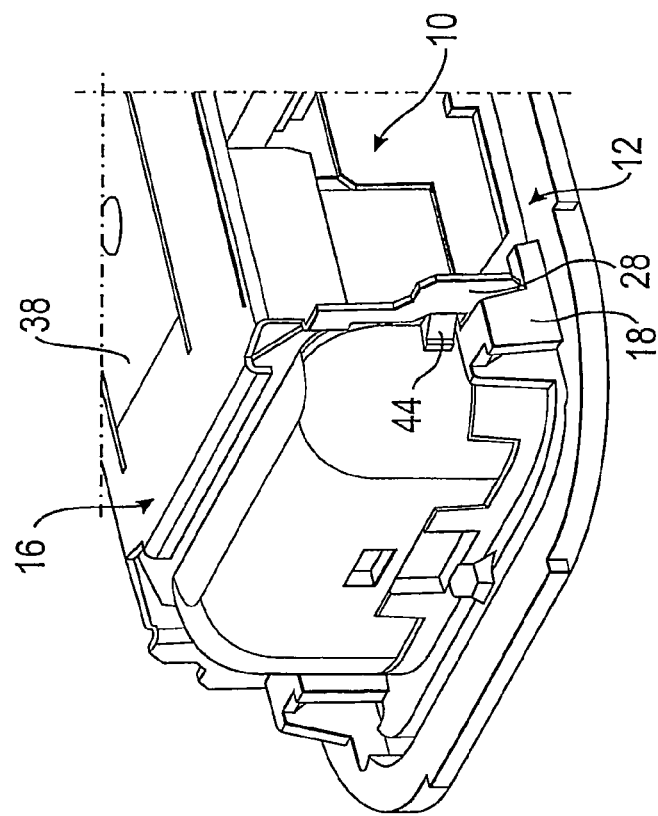
FIG. 12 shows a third step in mounting, in a view corresponding to that of FIG. 11.
Figure 16:
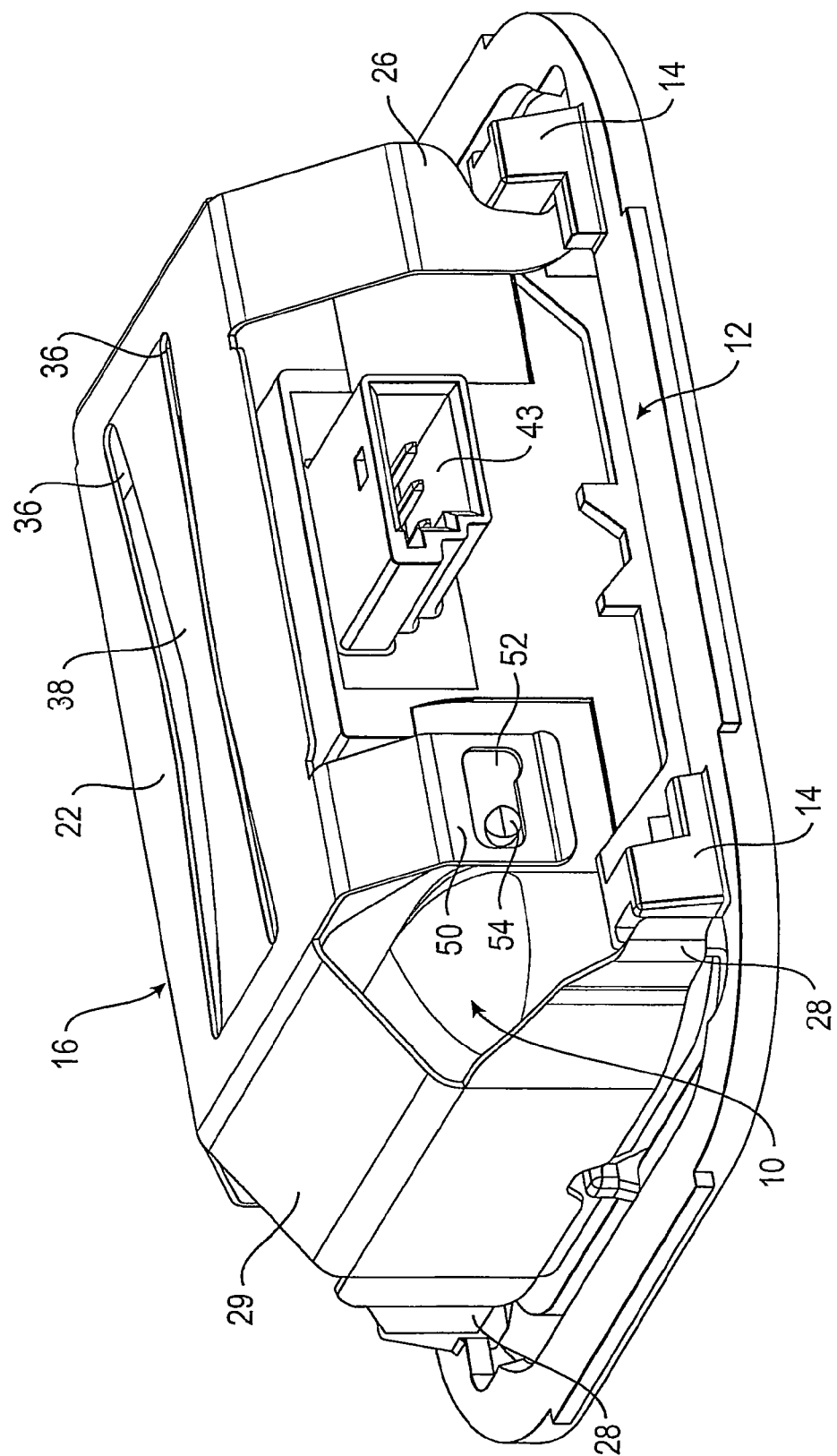
FIG. 16 shows a perspective view of the sensor mounted on the holding frame by means of a holding clip according to a second embodiment.
Figure 17:
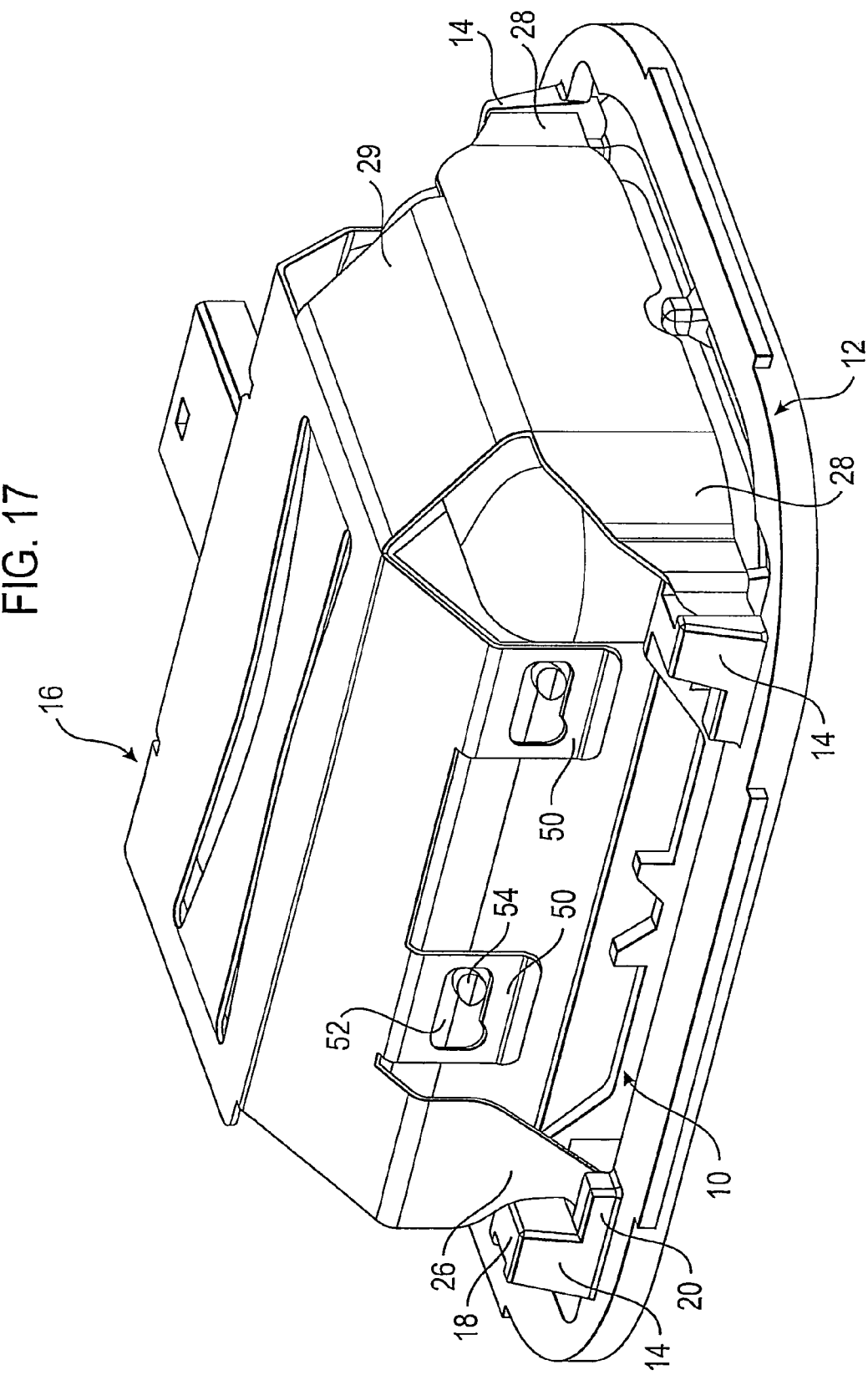
FIG. 17 shows a second perspective view of the sensor mounted by means of a holding clip according to a second embodiment.
Figure 18:
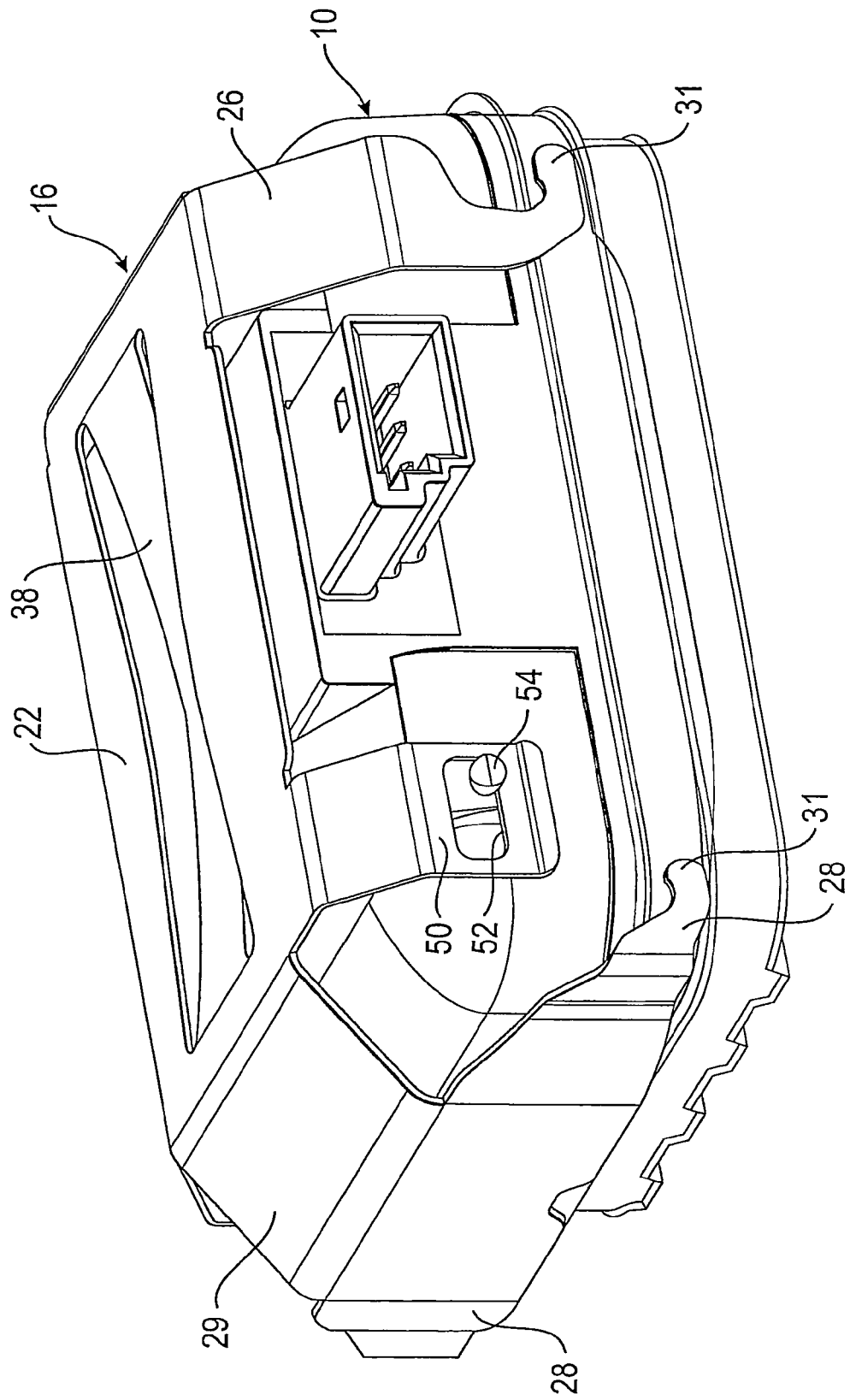
FIG. 18 shows a perspective view of the holding clip, pre-mounted on the sensor, according to the second embodiment.

If pressure is then applied in the direction of arrow P onto the side of the plate 22 of the holding clip 16 on which the detent arms 28 are situated, the plate 22 is pressed closer against the sensor 10 contrary to the elastic pressure force of the spring tongue 38. In so doing, the detent arms 28 move relative to the detent noses 44 so that the recesses 32 arrive into the region of the detent noses 44. Through this, the detent arms 28 are freed, so that they snap into their initial position (see FIG. 12) in which their feet 30 lie inside the brackets 18 on the holding frame 12. The sensor 10 is now correctly mounted on the holding frame 12, being acted upon elastically into its correct position. This can be readily seen by comparing the spring tongue in FIGS. 11 and 12; in FIG. 12, the spring tongue is deflected elastically from its initial position shown in FIG. 11, so that it presses the sensor into the holding frame 12.

The relative movement between the detent arms 28 and the detent noses 44 on the housing of the sensor 10 is shown again, for clarification, in FIGS. 13 to 15. The pre-mounted state is shown in FIG. 13, in which the detent nose 44 holds the detent arm 28 deflected. In FIG. 14, the detent arm 28 is shown in the state in which it is moved just so far downwards relative to the detent nose 44 that the detent nose can dip into the recess 32. In FIG. 15, the state is then shown in which the detent arm 28 is snapped back into its initial position.

A particular advantage of the holding clip according to the invention and of the assembly according to the invention consists in that the sensor, together with the pre-mounted holding clip, can be delivered to the vehicle in which the holding frame is already installed. The sensor, together with the holding frame, which is in a precisely defined state, can then be inserted by means of a simple manual movement into the holding frame, and can be pressed in against it, whereby the holding clip automatically engages. The snapping back of the detent arms also provides an acoustic indication that the engagement has taken place properly.

In FIGS. 16 to 30, a sensor 10 is shown with a holding clip 16 according to a second embodiment, and the mounting of the sensor 10 by means of this holding clip 16 is shown. The same reference numbers are used for the components known from the first embodiment, and reference is to be made to the above descriptions in this respect.

One difference between the first and second embodiments consists in that in the second embodiment the two detent arms 28 do not originate directly from the plate 22, but rather originate from a connecting cross-piece 29 which, in turn, is connected with the plate 22.

A further difference between the first and second embodiments consists in that in the second embodiment the two detent arms 28 and the two holding arms 26 do not have a bent foot 30, but rather in each case have a generally hook-shaped free end. A slightly widened tip 31, behind which (towards the holding arm 26 or detent arm 28) a depression is arranged, is provided at the free end of each holding arm 26 or detent arm 28. The distance from the plate 22 is less in the region of the widened tip 31 than in the region of the depression.

A further difference again between the first and the second embodiments consists in that in the second embodiment the tips 31 of the holding arms 26 and detent arms 28 are oriented in the same direction and not, like the feet 30 of the first embodiment, in opposite directions. Accordingly, in the second embodiment the abutments 14 on the holding frame 12 are open in the same direction, instead of in opposite directions, as in the first embodiment.

A further notable difference between the first and second embodiments consists in that in the second embodiment the holding clip 16 is provided with an installation aid, which is constructed in the form of three lateral tongues 50. These are arranged on the longitudinal sides of the plate 22. Two tongues 50 lie opposite each other and the third lies opposite the point at which the plug connector 43 of the sensor 10 is arranged. Each tongue has a guide link 52, into which a guide projection 54 of the sensor 10 engages. The guide link 52 is generally extended parallel to the plate 22 and has a depression to receive the guide pin at its front end, which points towards the widened tips of the holding arms 26 or detent arms 28. In general terms, the guide link 52 has the form of a horizontal "L", the short leg of the L pointing downwards, away from the plate 22.

In the initial state (FIG. 18), the holding clip 16 is pre-mounted on the sensor 10. The guide projections 54 of the sensor 10 engage into the guide links 52 of the holding clip 16 and lie in the depressions. The spring tongue 38 is not, or is only slightly, pre-stressed.

Figure 20:
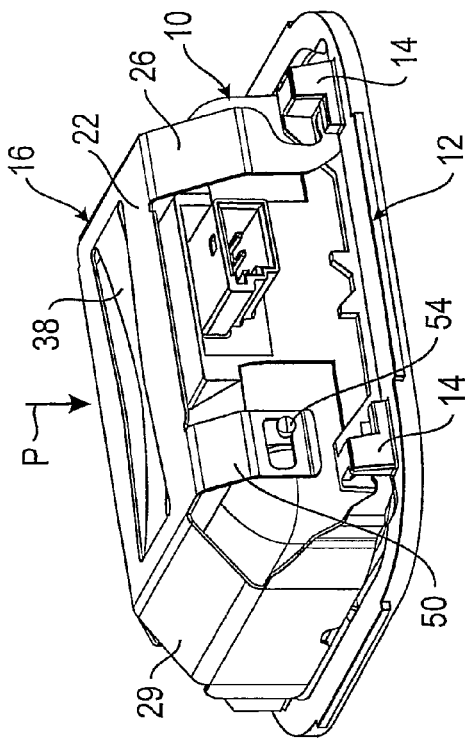
FIG. 20 shows the sensor and the holding clip of FIG. 18 after a first step in the mounting of the sensor on the holding frame.
Figure 21:
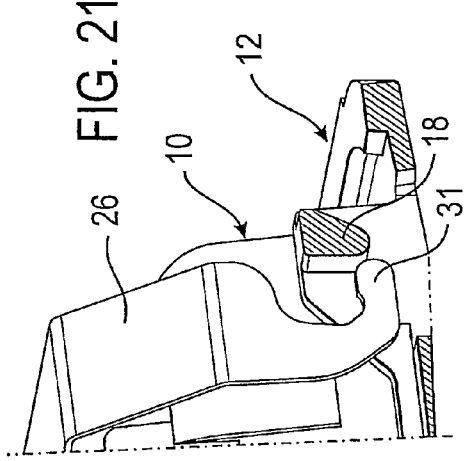
FIG. 21 shows in an enlarged view, partially in section, a detail of the assembly of FIG. 20.
Figure 19:
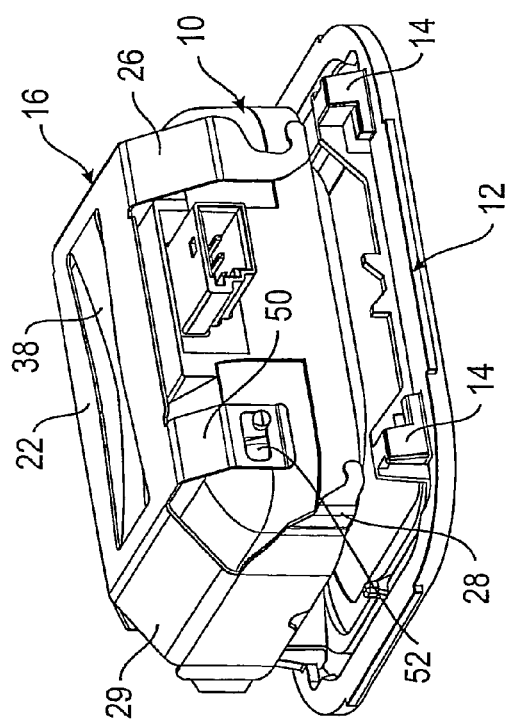
FIG. 19 shows the sensor and the holding clip of FIG. 18 before a first step in the mounting of the sensor on the holding frame.
Figure 24:
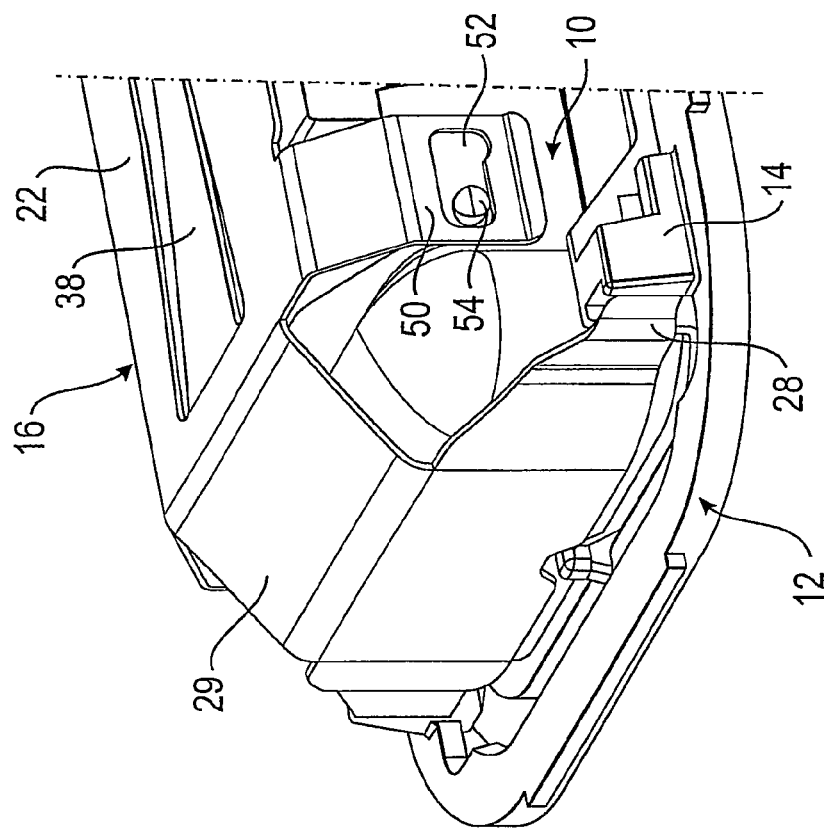
FIG. 24 shows the detent arms after the second mounting step.
Figure 23:
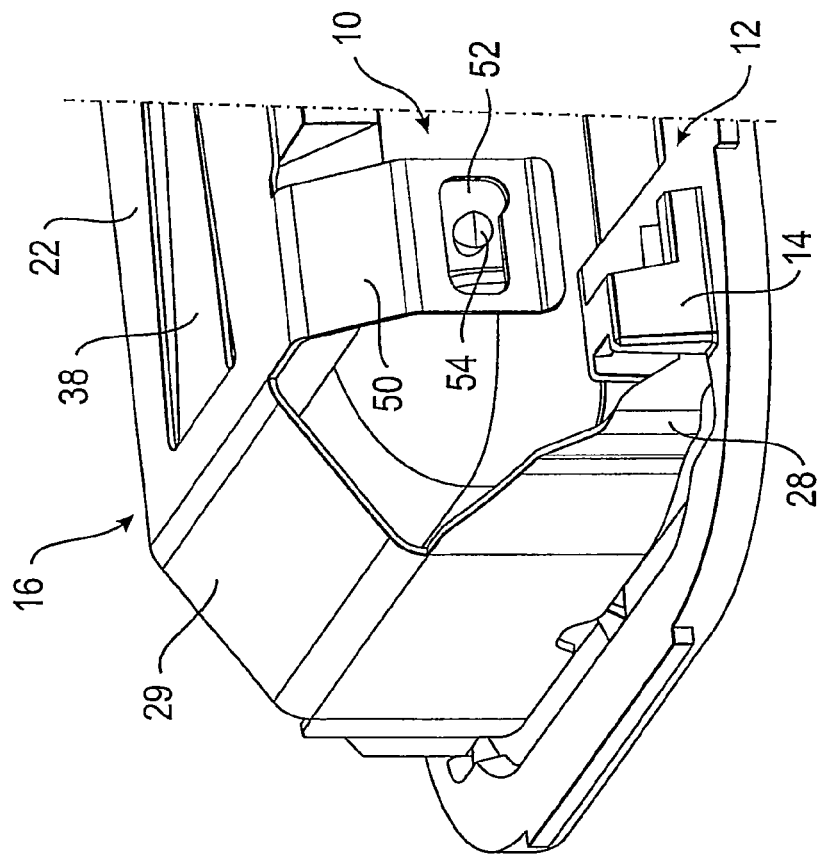
FIG. 23 shows the detent arms in an intermediate position during the second step in mounting on the holding frame.
Figure 28:
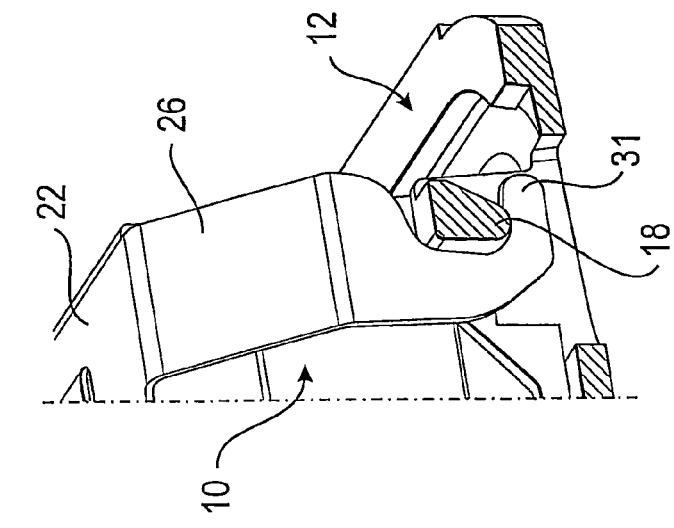
FIG. 28 shows in a view partially in section one of the holding arms before the second step in mounting on the holding frame.
Figure 29:
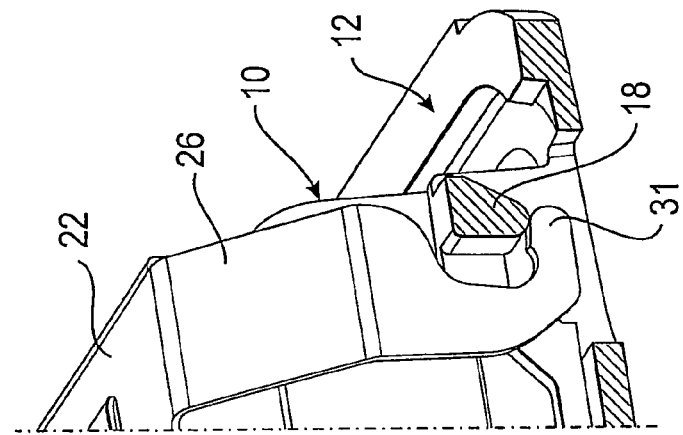
FIG. 29 shows the holding arm of FIG. 28 in an intermediate position during the second mounting step.
Figure 30:
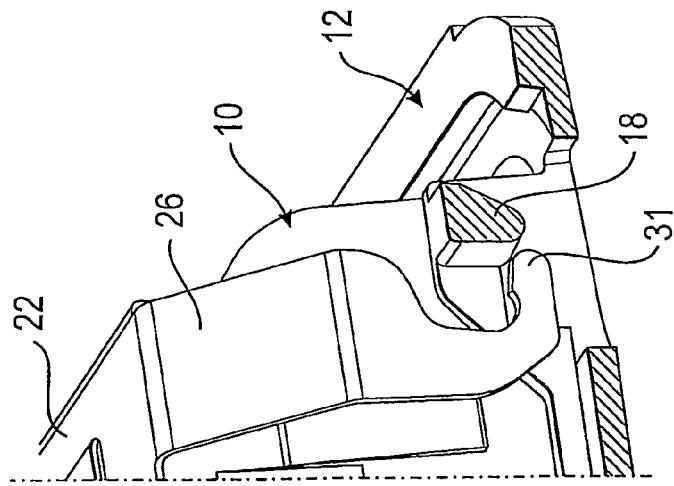
FIG. 30 shows the holding arm of FIG. 29 after the second mounting step.

The sensor 10 is mounted on the holding frame 14 by being placed onto the holding frame 12 in a first step in the direction of arrow P of FIG. 20 so that the tips of the holding arms 26 or detent arms 28 lie in front of the abutments 14 (see FIGS. 20, 21, 25 and 28). The sensor 10 is then already in its final position.

The holding clip 16 is then pressed in a second step in the direction of arrow P of FIG. 22 obliquely to the holding frame 12, i.e. downwards to the holding frame 12 and to the side. The guide links 52 and the guide projections 54 are of assistance here, because they prescribe the direction of movement. When the holding clip 16 is moved relative to the sensor 10 and to the holding frame 12, the widened tips of the holding arms 26 or detent arms 28 arrive into an intermediate position in which they lie under the brackets 18 of the abutments 14 (see FIGS. 26 and 29). In this intermediate position, the spring tongue 38 is pre-stressed to a maximum.

By further movement of the holding clip 16 relative to the sensor 10 and the holding frame 12, the widened tips 31 slip through beneath the brackets 18, so that they engage and come to lie in the depression behind the tip 31 of the holding arms 26 or detent arms 28. The holding clip 16 is now fastened securely on the holding frame 12, whereby the sensor 10 is also securely mounted. The pre-stressing is approximately 1 millimeter with a holding force of about 80 N.

The invention claimed is:

1. An assembly consisting of:
   a holding frame (12) which can be mounted on a pane of a motor vehicle;
   a sensor (10) which may be a rain sensor in particular; and
   a holding clip (16) with a plate (22), said plate (22) being able to cover said sensor (10), at least one holding arm (26) and at least one detent arm (28), said holding arm (26) and said detent arm (28) being constructed such that they can engage on a holding frame (12) for said sensor (10), said plate (22), said at least one holding arm (26) and said at least one detent arm (28) being formed integrally as one piece;
   wherein said holding frame has an abutment (14), said detent arm (28) of said holding clip (16) has a recess (32) and said sensor (10) has a detent nose (44), said detent nose (44) cooperating with said recess (32) in said detent arm (28) of said holding clip (16) such that said detent nose (44) can hold said detent arm (28) in a pre-mounted state in which said detent arm (28) can be inserted into said abutment (14) on said holding frame (12), and can arrest said detent arm (28) in a detent position after said sensor (10) is mounted on said holding frame.

2. An assembly for a pane of a motor vehicle comprising:
   a holding frame (12) mounted to the pane;
   a rain sensor (10) having a rear side facing away from the holding frame and the pane when the assembly is connected to the pane; and
   a one-piece holding clip (16) having:
   a plate (22) for covering the rain sensor (10);
   at least one holding arm (26) extending from the plate toward the holding frame; and
   at least one detent arm (28) extending from the plate (22) toward the holding frame (12), the plate (22) extending from the at least one holding arm (26) to the at least one detent arm (28) with the rear side of the rain sensor (10) substantially between the plate (22) and the holding frame (12) to cover the rain sensor (10) when the rain sensor is connected with the holding frame (12);
   the at least one holding arm (26) and the at least one detent arm (28) engaging the holding frame (12) to mount the rain sensor (10) to the holding frame (12), the plate (22), the at least one holding arm (26) and the at least one detent arm (28) being integral with each other,
   wherein the holding clip (16) is pre-mounted to the rain sensor (10) before the holding clip (16) is engaged with the holding frame (12),
   wherein the at least one detent arm (28) has a first condition deflected towards the at least one holding arm (26) by a detent nose (44) on the rain sensor (10) when the holding clip (16) is pre-mounted to the rain sensor (10) and a second, undeflected condition in which the detent nose (44) is retained in a recess (32) of the at least one detent arm (28) when the holding clip (16) is engaged with the holding frame (12).

3. The assembly according to claim 2, wherein the at least one detent arm (28) moves from the first condition to the second condition due to a downward force applied to the plate (22) towards the holding frame (12).

4. An assembly for a pane of a motor vehicle comprising:
   a holding frame (12) mounted to the pane;
   a rain sensor (10) having a rear side facing away from the holding frame and the pane when the assembly is connected to the pane; and
   a one-piece holding clip (16) having
   a plate (22) for covering the rain sensor (10);
   at least one holding arm (26) extending from the plate toward the holding frame; and
   at least one detent arm (28) extending from the plate (22) toward the holding frame (12), the plate (22) extending from the at least one holding arm (26) to the at least one detent arm (28) with the rear side of the rain sensor (10) substantially between the plate (22) and the holding frame (12) to cover the rain sensor (10) when the rain sensor is connected with the holding frame (12);
   the at least one holding arm (26) and the at least one detent arm (28) engaging the holding frame (12) to mount the rain sensor (10) to the holding frame (12), the plate (22), the at least one holding arm (26) and the at least one detent arm (28) being integral with each other,
   wherein the holding clip (16) is pre-mounted to the rain sensor (10) before the holding clip (16) is engaged with the holding frame (12),
   wherein the plate (22) includes a spring tongue (38) having a first condition bent downwards from a plane of the plate (22) when the holding clip (16) is pre-mounted to the rain sensor (10) and a second condition deflected towards the plane of the plate (22) and pressing the rain sensor (10) into the holding frame (12) when the holding clip (16) is engaged with the holding frame (12).

5. The assembly according to claim 4, wherein the spring tongue (38) moves from the first condition to the second condition due to a downward force applied to the plate (22) towards the holding frame (12).

6. An assembly for a pane of a motor vehicle comprising:
   a holding frame (12) mounted to the pane;
   a rain sensor (10) having a rearmost side facing away from the holding frame and the pane when the assembly is connected to the pane; and
   a one-piece holding clip (16) having
   a plate (22) for covering the rain sensor (10);

at least one holding arm (26) extending from the plate toward the holding frame; and at least one detent arm (28) extending from the plate (22) toward the holding frame (12), the plate (22) extending from the at least one holding arm (26) to the at least one detent arm (28) with the rearmost side of the rain sensor (10) substantially between the plate (22) and the holding frame (12) to cover the rain sensor (10) when the rain sensor is connected with the holding frame (12);

the at least one holding arm (26) and the at least one detent arm (28) engaging the holding frame (12) to mount the rain sensor (10) to the holding frame (12), the plate (22), the at least one holding arm (26) and the at least one detent arm (28) being integral with each other.

7. The assembly according to claim 6, wherein the at least one holding arm (26) has a straight outer contour and the least one detent arm (28) has a recess (32) on its inner side.

8. The assembly according to claim 6, wherein the plate (22) includes a spring tongue (38) pressing the sensor (10) into the holding frame (12).

9. The assembly according to claim 8, wherein the spring tongue (38) includes an opening (40) receiving a fixation projection (42) of the rain sensor (10).

10. The assembly according to claim 6, wherein the holding clip (16) is pre-mounted to the rain sensor (10) before the holding clip (16) is engaged with the holding frame (12).

11. The assembly according to claim 6, wherein the at least one detent arm (28) and the at least one holding arm (26) include tips (31) which extend in the same direction and engage the holding frame (12).

12. The assembly according to claim 6, wherein the holding clip (16) includes a lateral tongue (50) having a guide link (52) for receiving a guide projection (54) of the rain sensor (10).

13. The assembly according to claim 12, wherein the holding clip (16) is pre-mounted to the rain sensor (10) before the holding clip (16) is engaged with the holding frame (12).

14. The assembly according to claim 13, wherein the guide projection (55) is positioned in a first portion of the guide link (52) when the holding clip (16) is pre-mounted to the rain sensor (10) and in a second portion of the guide link (52) when the holding clip (16) is engaged with the holding frame (12).

15. The assembly according to claim 14, wherein the guide projection (55) moves from the first portion to the second portion of the guide link (52) due to lateral movement of the holding clip (16) relative to the rain sensor (10).

16. The holding clip according to claim 6, wherein said plate (22) has a portion extending between said holding arm (26) and said detent arm (28) that is spaced farther from said holding frame (12) than the entire rear side of said sensor (10) when said sensor is connected with said holding clip (16).

* * * * *